United States Patent [19]

Zimmerman et al.

[11] Patent Number: 5,384,832
[45] Date of Patent: Jan. 24, 1995

[54] METHOD AND APPARATUS FOR A TELEPHONE MESSAGE ANNOUNCING DEVICE

[75] Inventors: Fred C. Zimmerman, Deephaven; Verne L. Severson, Chaska, both of Minn.

[73] Assignee: CommStar, Inc., Eden Prairie, Minn.

[21] Appl. No.: 973,405

[22] Filed: Nov. 9, 1992

[51] Int. Cl.6 .................................................... H04M 9/00
[52] U.S. Cl. .......................................... 379/67; 379/89; 379/84; 379/396
[58] Field of Search .................. 379/376, 89, 84, 396, 379/157

[56] References Cited

U.S. PATENT DOCUMENTS

| | | | |
|---|---|---|---|
| 3,865,985 | 2/1975 | Stankus | 379/201 |
| 4,280,021 | 7/1981 | Yuan | 379/376 |
| 4,298,774 | 11/1981 | Jusinskas | 379/373 |
| 4,338,494 | 7/1982 | Theis | 379/72 |
| 4,533,792 | 8/1985 | Binks | 379/372 |
| 4,582,957 | 4/1986 | Hayes | 379/376 |
| 4,747,126 | 5/1988 | Hood | 379/73 |
| 4,853,952 | 8/1989 | Jachmann | 379/89 |
| 4,969,186 | 11/1990 | Sayre | 379/370 |

*Primary Examiner*—James L. Dwyer
*Assistant Examiner*—Michael N. Lau
*Attorney, Agent, or Firm*—Patterson & Keough

[57] ABSTRACT

The local telephone message announcing device automatically checks a remote telephone voice messaging system for stored messages in a consistent and timely manner, announces the presence of stored messages through an external indicator and automatically connects the user to the stored messages upon entry of a predetermined command by the user. The device checks for the stored messages by detecting a unique tone sent to a user's telephone set or telephone number by the remote telephone voice messaging system to indicate the presence of stored messages. The detection occurs at predetermined time intervals whereby interference with the operation of the local telephone set is minimized. In addition, the device is easily installed by a person without technical expertise and can be adapted to any type of telephone set.

3 Claims, 4 Drawing Sheets

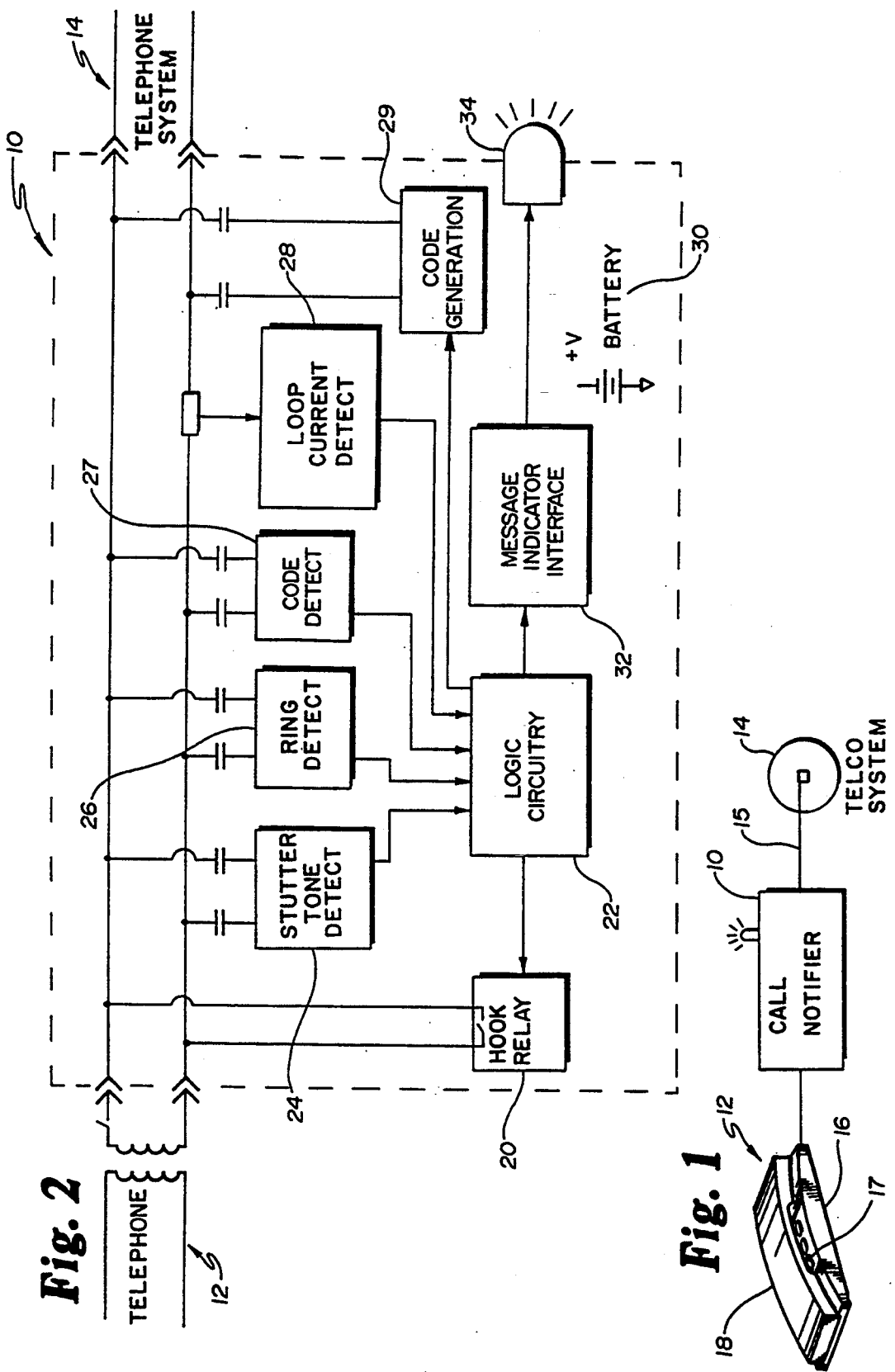

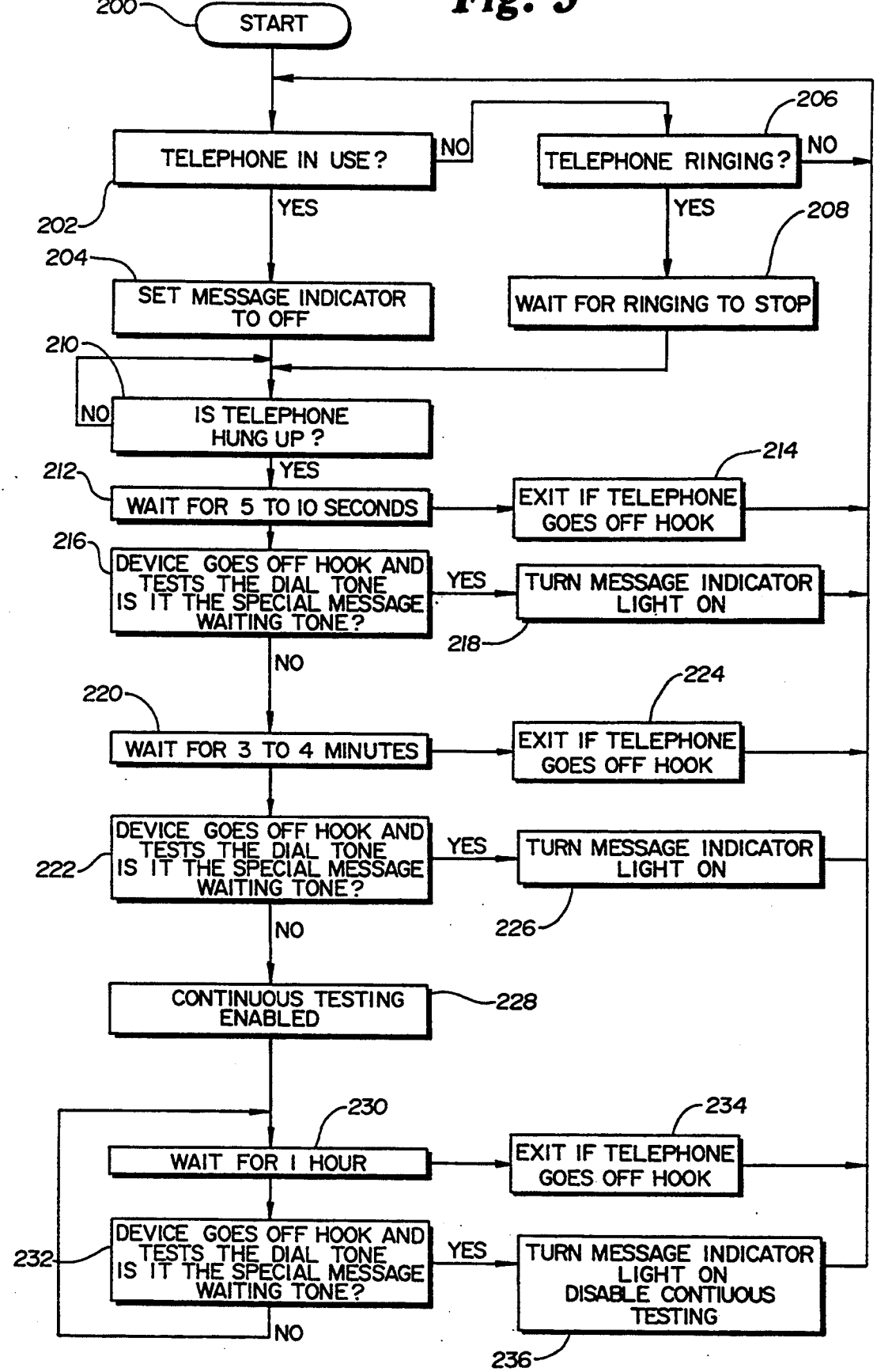

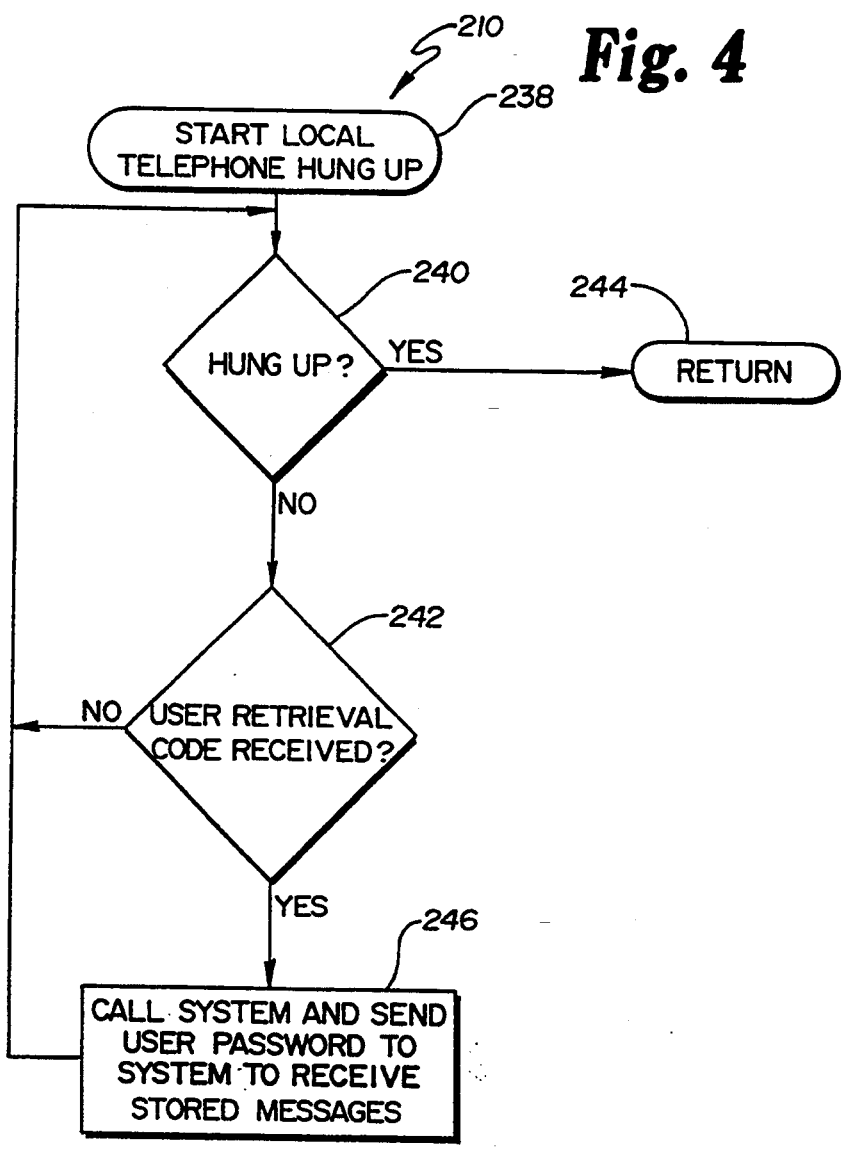

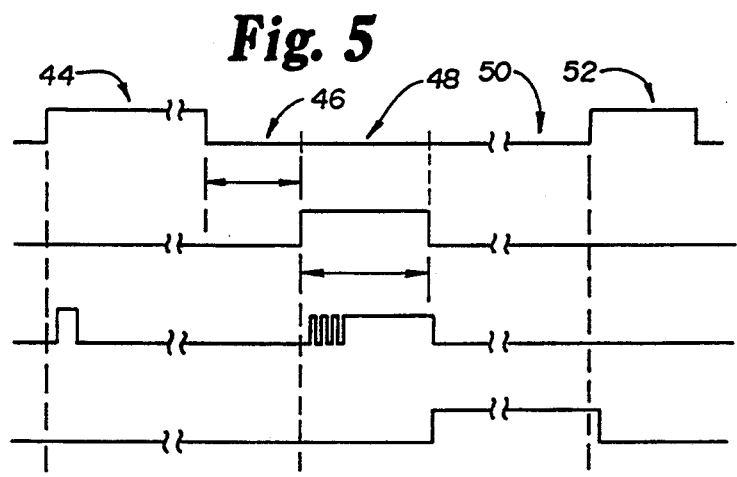
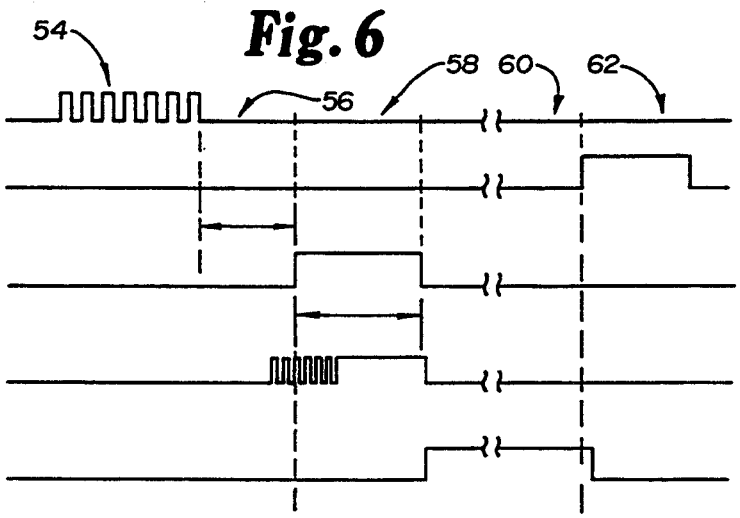
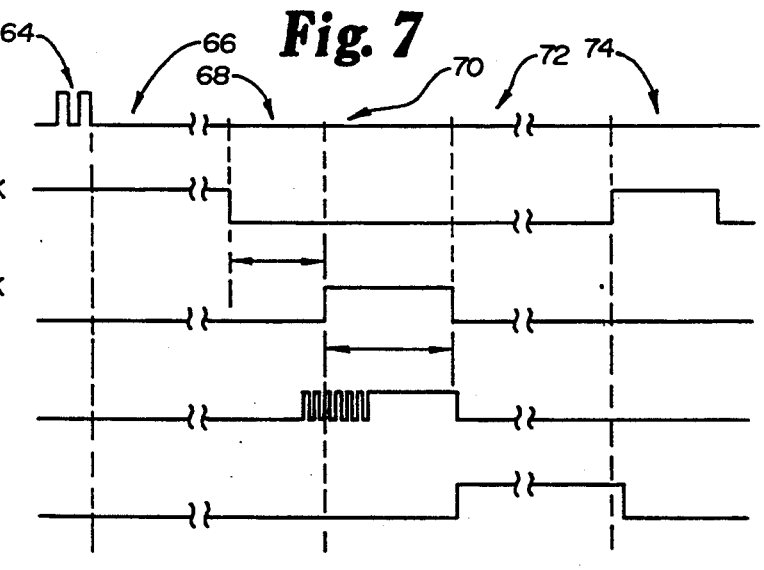

METHOD AND APPARATUS FOR A TELEPHONE MESSAGE ANNOUNCING DEVICE

TECHNICAL FIELD

The present invention relates generally to telephone voice messaging systems. More particularly, the present invention relates to a system for detecting the presence of a message stored in a remote site and alerting a user to the presence of the stored message.

BACKGROUND OF THE INVENTION

Over the years, many types of telephone voice messaging systems have been developed. There are two general types of telephone voice messaging systems: local and remote. Both systems record and store voice messages from incoming telephone calls after a specified number of rings go unanswered. Typically, a local telephone voice messaging system is physically cabled to a local telephone set and stores telephone messages on a device near the local telephone set. A user commonly is alerted to the presence of stored messages by an indicator, such as a light, on the storage device itself. An example of a local telephone messaging system is a personal or home telephone answering machine.

In contrast, a remote telephone voice messaging system stores telephone messages at a site remote from the user. A remote telephone voice messaging system typically includes a central switchboard for intercepting telephone calls and storing messages. An example of an automated remote telephone voice messaging system is the system offered by a number of Regional Bell Operating Companies.

In a Regional Bell Operating Companies (RBOC) telephone voice messaging system, the telephone company automatically intercepts any telephone calls intended for a local telephone number which are not answered after a predetermined number of rings. Additionally, the RBOC system will intercept and store messages intended for a local telephone number that is busy. The telephone voice messaging system then records and stores any message at the telephone company office. The telephone voice messaging system alerts a user to the presence of stored messages by changing the dial tone of the user's telephone set to a unique tone. The user recognizes the tone by picking up the receiver of the telephone set and listening. The user then accesses the messages stored by the telephone company according to the prescribed procedures for that telephone voice messaging system.

The problem with current automated telephone voice messaging systems is that the procedure of checking the dial tone must be performed many times a day in order to ensure that the user is receiving their messages in a timely manner. Although relatively simple to implement for the telephone companies, the use of a special tone to alert users to stored messages is a time and labor intensive process for the system user. For system users who are physically challenged or handicapped, for example, frequent and consistent manual manipulation of the telephone set to check for stored messages may be very difficult.

At the heart of the problem with current automated telephone voice messaging systems is the lack of an external indicator to alert a user to the presence of stored messages. Users may not receive their messages in a timely manner unless they consistently remember to lift the telephone receiver and listen for the special tone. Users typically do not lift the telephone receiver and listen on a consistent basis without being prompted by a audible ring or visual reminder. For example, if a user has not been near their telephone set for an extended period of time, the user may not have a reason to lift the receiver and thus, would not receive their messages in a timely manner. As another example, when a message is left while the user is using the telephone set, the user would not know of the message unless the user remembered to lift the receiver a few moments after hanging up the receiver. Lifting the receiver just after completing a telephone call is awkward and not intuitive.

One solution to the lack of an external indicator is installing an external indicator, such as a light, directly on a telephone set. However, installation of a light directly on a telephone set requires significant technical expertise in dismantling and reconfiguring a telephone set. Uniform installation procedures for an external indicator are not possible because of the great variety of styles of telephone sets available. Depending upon the style of telephone set, the addition of an external indicator may not be aesthetically pleasing. Installation of a light on the telephone is not really a solution since there is no signal supplied by the telephone system that could turn it on.

For these reasons, an invention that could automatically check a remote telephone voice messaging system for stored messages in a consistent and timely manner, announce the presence of stored messages through an external indicator and, optionally, automatically connect the user to a stored message center upon entry of a predetermined command would minimize the time and manual effort required of the user of such a remote telephone voice messaging system. It would be advantageous if such an invention could be easily installed by a person without technical expertise and could be adaptable to any type of telephone set. It would also be desirable for such an invention to improve the performance of device which announces the messages stored by a remote telephone voice messaging system, while minimizing the number and complexity of required components and circuitry.

SUMMARY OF THE INVENTION

The present invention provides an automated local system for detecting a unique tone sent to a user's telephone set or telephone number by a remote telephone voice messaging system to indicate the presence of stored messages, alerting the user to the presence of any messages stored by the telephone voice messaging system as indicated by the tone without the need for any manual intervention by the user and, optionally, connecting the user to a remote message storage in response to the entry of a simple command by the user.

It is a primary objective of the present invention to provide a local system for detecting the presence of a unique tone indicating the presence of stored messages in a remote telephone voice messaging system occurs in a consistent, reliable and timely manner without the manual intervention of a user.

It is also an objective of the present invention to provide an easy-to-use, convenient system to notify a user of stored messages in a remote telephone voice messaging system.

It is a further objective of the present invention to provide a telephone message announcing system in a remote telephone voice messaging system that can detect the presence of stored messages without significantly interfering with the operation of the local telephone set.

It is also an objective of this invention to provide a telephone message announcing system in accordance with the present invention that minimizes the number and complexity of the components and circuitry of the device thereby enhancing performance and reducing costs.

These and other objectives of the present invention will become apparent with reference to the drawings, the detailed description of the preferred embodiment and the appended claims.

BRIEF DESCRIPTION OF THE DRAWINGS

FIG. 1 is a simplified schematic diagram depicting a telephone message announcing device, local telephone set and remote telephone voice messaging system in accordance with the present invention.

FIG. 2 is a block diagram of a telephone message announcing device in accordance with the present invention.

FIG. 3 is a flowchart depicting the message detection and announcement process of the present invention.

FIG. 4 is a flowchart depicting the optional message retrieval process of the present invention.

FIG. 5 is a timing diagram depicting the changing states of the telephone set, device, remote telephone voice messaging system and message indicator when the local telephone set initiates a telephone call and the system receives a telephone call while the local telephone set is in use.

FIG. 6 is a timing diagram depicting the changing states of the telephone set, device, remote telephone voice messaging system and message indicator after an unanswered telephone call has been answered by the telephone voice messaging system.

FIG. 7 is a timing diagram depicting the changing states of the telephone set, device, remote telephone voice messaging system and message indicator after a telephone call is answered by the user and the system receives a telephone call while the local telephone set is in use.

DETAILED DESCRIPTION OF THE INVENTION

Referring now to the figures, the preferred embodiment of the system of the present invention will be described. For purposes of this description, it is assumed that the reader is familiar with the basic telephony concepts and terminology.

Referring to FIG. 1, a telephone message announcing device 10 in accordance with the present invention (labeled as a call notifier) is operably connected to a local telephone set 12 and to a remote telephone voice messaging system 14 through a telephone line 15. The local telephone set 12 typically includes a cradle 16, numeric keypad 17 and receiver 18.

Referring to FIG. 2, the device 10 includes a hook relay circuit 20, logic circuitry 22, one or more tone detection circuits 24, 26, a code detection circuit 27, a current detection circuit 28, a code generation circuit 29, a power source 30 such as, for example, a battery or an AC adapter, an external message indicator interface 32 and an external message indicator 34. As described in greater detail hereinafter, the logic circuitry 22 includes various timing elements which synchronize the actions and processing of the logic circuitry 22. In the preferred embodiment, the logic circuitry 22, the tone detection circuits (referenced in the drawings as "stutter tone detect" and "ring detect" respectively) 24, 26, code detection circuit 27, current detection circuit (referenced in the drawings as "loop current detect") 28 and code generation circuit 29 are integrated in a customized monolithic microchip which minimizes the circuitry of the device 10. It will be understood by those skilled in the art that the various circuits 24, 26, 27, 28, 29 could also be implemented using discrete elements operably coupled to a microprocessor, for example, rather than to the logic circuitry 22.

Operation of the device 10 is best understood with reference to FIGS. 3–7. Referring to FIG. 5, the timing diagram illustrates the changes in the state of the local telephone receiver 18, the device 10, the remote telephone voice messaging system 14 and the external message indicator 34 for various sequences of events. Changes in state are indicated by the changes in the position of the horizontal lines for each component 18, 10, 14, 34 while concurrent time intervals 44–74 are indicated by the vertical dashed lines. The change in the state of the telephone voice messaging system 14 indicates the presence and absence of a message waiting tone. Referring to FIGS. 6 and 7, the timing diagrams are similar to the timing diagram of FIG. 5 with the additional illustration of the changes in the state of incoming telephone line 15. The change in the position of the horizontal line for the telephone line 15 indicates the presence or absence of a ring tone.

Referring again to FIG. 1, in operation, the device 10 is operably connected to telephone set 12 via standard telephone line 15 with a standard connector (not shown) at each terminal. One terminal connector is inserted in a corresponding receptor (not shown) on the telephone set 12 and the second terminal connector is inserted in a corresponding receptor (not shown) on the device 10 such that the device can detect whether the telephone set is in use or not.

The device is also operably coupled to the telephone voice messaging system 14 via a standard telephone line 15 with a standard connector (not shown) at the line terminal. The line terminal connector is inserted in a corresponding receptor (not shown) on the device 10 whereby the device 10 can detect the readiness of the telephone line 15 to accepting and sending calls and can detect any tones sent along the telephone line 15.

Use of the standard, uniform telephone line connectors ensure easy installation of the device. Because the device 10 as a freestanding unit, physically separate from the telephone set 12, installation of the device 10 does not interfere with the aesthetic appeal of any telephone set 12 and can be adapted for use with any telephone set 12 regardless of its style or form. In addition, the device 10 can be selectively positioned by the user in the local environment such that the indicator 34 is easily visible to the user.

Referring again to FIG. 2, in the preferred embodiment, the device 10 is powered by a battery or AC adapter 30 and controlled by the logic circuitry 22 so as not to interfere with the telephone line power. Alternatively, if permitted by local telephone company regulations, the device 10 could be configured to draw its power from the telephone line 15. The logic circuitry 22 analyzes the data obtained from the stutter tone detection circuit 24, the ring detection circuit 26, the code detection circuit 27 and the loop current detection circuit 28 and controls the operation of the device 10 based on the data obtained. With the exception of the stutter tone detection circuit 24 and the logic circuitry 22, all of the other circuitry 26, 27, 28, 29 operates in a conventional manner and is known to one skilled in the telephony art.

During operation, the loop current detect 28 indicates whether the telephone set 12 is on or off the hook. The device 10 uses the hook relay 20 to simulate the telephone set 12 being off hook when the device 10 tests the telephone line 15 for a message waiting tone or accesses the remote telephone voice messaging system 14. The loop current detection circuit 28 continually checks that the telephone line 15 is being used by the local telephone 12 and provides that information to the logic circuitry 22.

The preferred embodiment of the invention includes a ring tone detection circuit 26 for detecting when an incoming telephone call is ringing the telephone set 12, a stutter tone detection circuit 24 for detecting when the message waiting tone is detected, and a loop current detect circuit 28 for determining when the local telephone 12 is in use. Also, in the optional version, the preferred embodiment includes a code detection circuit 27 for detecting when the user enters a code to retrieve stored messages and a code generation circuit 29 for accessing the remote telephone voice messaging system 14 when the user wishes to retrieve stored messages. The code detection circuit 27 and code generation circuit 29 use standard DTMF codes in the preferred embodiment. The logic circuitry periodically actuates the hook relay 20, simulating the telephone off hook, and checks the stutter tone detection circuit 24 for the presence of the message waiting tone on the telephone line 15. It will be understood that the tone used to indicate a message stored at a remote telephone voice messaging system 14 may be any distinct tone that the telephone company has chosen to indicate messages have been stored for that user. In this embodiment, the message waiting tone is a stutter tone, as shown, for example, in FIGS. 5-7.

In the preferred embodiment, the code detection circuit 27 monitors the telephone line 15 in response to an off hook condition to test for the presence of a predetermined DTMF numeric code sequence transmitted from the local telephone numeric keypad 17. In response to the predetermined DTMF numeric code sequence, the logic circuitry 22 initiates the calling of the remote telephone voice messaging system 14 and entry of a preselected user password code via the code generation circuit 29.

The external message indicator 34 may be a light or a bell or a recorded beep or any combination thereof such that the indicator 34 preferably has at least two modes of operation. One indicator mode alerts the user to the presence of messages stored by the remote telephone voice messaging system. The second mode indicates the absence of messages stored by the remote telephone voice messaging system. The external message indicator interface 32, here labeled LED blinker, maintains the message indicator 34 in whichever mode is currently appropriate.

As is described in greater detail hereinafter, in the preferred embodiment of the present invention, the device 10 operates in two modes: a call detection mode and a continuous testing mode. The call detection mode is first initiated in response to the device 10 detecting that the user is utilizing the telephone set 12 or that the telephone set 12 is ringing with an incoming call. After the first initiation of the call detection mode, the call detection mode is set when the external message indicator 34 is turned on or the telephone set 12 is off hook.

While operating in the call detection mode, the device 10 performs at least two tests of the telephone line 15 for the presence of the message waiting tone. The first test is performed, for example, a few seconds after the event or series of events triggering the call detection mode have terminated in order to alert the user to messages that may have been stored while the user was on the line or to a message that were stored from an unanswered incoming telephone call. The second test is performed, for example, a few minutes after the first test to detect a message waiting tone that would not have been detected during the first test. A message waiting tone may not have been detected during the first test when, for example, the message being stored is very long and is in the process of being stored when the first test occurs or when, for example, an incoming telephone call is received while the device 10 is off hook during the first test. It will be understood that the chance of an incoming telephone call being received while the device 10 is off hook testing the telephone line 15 is greatly reduced because of the small amount of time, for example, less than ten seconds, that the device 10 is off hook.

In the preferred embodiment, the continuous testing mode is enabled when the device 10 has not detected a message waiting signal after completing the call detection mode tests and is disabled when the external message indicator 34 is turned on or the telephone set 12 is off hook. In an alternate embodiment, the continuous testing mode is disabled only when the telephone set 12 is off hook. If, for example, a remote telephone voice messaging system 14 permits retrieval of stored messages from remote telephone sets other than the local telephone set 12 and/or forwarding of calls to the remote telephone voice messaging system 14 without ringing the telephone set 12, then, in an alternate embodiment of the present invention, the device 10 would continue to test for the presence and absence of the message waiting tone and turn the external message indicator 34 off and on accordingly while operating in the continuous testing mode. The continuous testing mode would be disabled when the user utilized the local telephone set or an incoming telephone call was ringing the local telephone set.

As those skilled in the art will appreciate, the choice of the timing intervals between tests for presence of the message waiting tone may vary depending upon the event or series of events that triggers the need to check. For example, if an incoming telephone call was received while the user was taking a call and thus the receiver 18 was off hook, it is likely that the remote telephone voice messaging system 14 took a message and so a relatively short waiting period between the time the user hangs up the telephone receiver 18 and the device 10 tests for the message waiting tone may be preferable. On the other hand, a longer waiting period between tests as occurs when the device 10 operates in the continuous testing mode may be desirable when both incoming and outgoing telephone calls are infrequent.

Referring to FIG. 3, in the preferred embodiment, the device 10 begins (step 200) by testing whether the telephone set 12 is in use (step 202). If the telephone set 12 is in use, the device 10 checks whether the external message indicator 34 is on, indicating there is a message stored. In the preferred embodiment, shown, for example, in FIG. 3, the device 10 automatically turns the external message indicator 34 off when the local telephone set 12 goes off hook without ringing first (step 204). In the preferred embodiment, when the local telephone set 12 goes off hook without ringing first, it is assumed the user has picked up the local telephone set 12 and will hear the special dial tone. Once the user hangs up, the device 10 automatically checks the line 15. In an alternative embodiment of the present invention, the device 10 turns the external message indicator 34 off only in response to the user's entry of a predetermined indicator code.

If the telephone set 12 is not in use, the device 10 tests whether the telephone set 12 is ringing as indicated by the ring detection circuit 26 (step 206). If the telephone set 12 is ringing (step 206), then the device 10 waits for the telephone set 12 to stop ringing (step 208). If the telephone set 12 is not in use and is not ringing (steps 202, 206), no call has been received and so the device 10 continues testing in the manner described hereinafter until a call is received.

Once a call has been received, the device 10 waits for the call to end and tests the status of the telephone set 12 until the hook relay 20 indicates the telephone set 12 has been hung up (step 210). The device 10 waits for a first waiting period (step 212) and then tests whether the user has picked up the telephone receiver 18 to place a call during the first waiting period (step 214). In the preferred embodiment, the first waiting period is a few seconds though it is understood that the first waiting period may be of any length that would allow the telephone line 15 to clear and would provide the user with timely notice of their messages, particularly messages that may have been received while the user was taking a telephone call. If the local telephone receiver 18 has been picked up for placement of a call during the first waiting period, the device 10 repeats steps 202-212 until the user is no longer placing any calls.

Once the telephone set 12 is on hook, the device 10 tests the telephone line 15 for the message waiting tone (step 216) as indicated by the stutter tone detection circuit 24. If the message waiting tone is detected, the device 10 turns the message indicator 34 on to indicate stored messages (step 218).

If the message waiting tone is not detected, the device 10 waits for a predetermined second waiting period (step 220) before testing the telephone line 15 for the message waiting tone (step 222). In the preferred embodiment, the second waiting period is a few minutes in length though it is understood that the second waiting period may be of any length longer than the first waiting period that would provide the user with timely notice of their messages without significantly interfering with the operation of the telephone set 12. If the local telephone receiver 18 has been picked up for placement of a call during the second waiting period, the device repeats steps 202-220 until the telephone set is no longer off hook (step 224).

If the telephone set 12 does not become off hook during the second waiting period, the device 10 tests the telephone line 15 for the message waiting tone (step 222). If the message waiting tone is detected by the stutter tone detection circuit 24, the microprocessor activates the message indicator 34 via the message indicator interface 32 to indicate that there are stored messages at the telephone company office (step 226). The device 10 then enters the continuous testing mode in order to continually check the telephone line 15 for the message waiting tone indicating messages stored at the telephone company office (steps 202-224).

If no message waiting tone is detected by the stutter tone detection circuit 24, then the device 10 then initiates the continuous testing mode (step 228). Once the continuous testing mode is enabled, the device 10 waits for a predetermined third waiting period (step 230) before testing the telephone line 15 for the message waiting tone (step 232). In the preferred embodiment, the third waiting period is one hour though it is understood that the third waiting period may be of any length longer than the second waiting period that still would provide the user with timely notice of their messages. If the telephone set 12 is off hook during the third waiting period (step 234), the device 10 repeats steps. 202-230 until the telephone set 12 remains on hook during the third waiting period. In the preferred embodiment, the third waiting period is established on the assumption that the user is absent from the premises with the local telephone set 12 during the third waiting period and so monitoring need not occur as frequently thereby conserving the battery supply of the device 10 and decreasing the interference with the operation of the local telephone set 12.

If the telephone set 12 does not become off hook during the third waiting period, the device 10 continues to test the telephone line 15 for the message waiting tone until the message waiting tone is detected (steps 230, 232). In the preferred embodiment, once the message waiting tone is detected, the message indicator is set to indicate the presence of stored messages and the continuous testing mode is disabled (step 236). Next, the device begins the process anew (steps 202-236).

FIG. 4 depicts an alternative embodiment of step 210 of FIG. 3 featuring the optional message retrieval process of the present invention.

Referring to FIG. 4, the device 10 begins (step 238) the procedure to connect the user to the remote telephone voice messaging system 14 to retrieve the stored messages by detecting the user's entry of a predetermined numeric retrieval code on the keypad 17 of the telephone set 12 (step 242) during an off hook condition.

The device 10 tests for an off hook condition (step 240). If an off hook condition is detected, the device 10 then tests for the receipt of the numeric retrieval code by the logic circuitry 22 (step 242). If the device 10 receives the numeric retrieval code, the device 10 calls the telephone voice messaging system 14 using a prestored telephone number and sends a preselected user password to the telephone voice messaging system 14 (step 246). The entry of the user password initiates the user's access to the messages stored by the telephone voice messaging system 14. Once the user is linked to the telephone voice messaging system 14, the device 10 tests until the user hangs up the telephone set 12 (step 240), indicating the user has retrieved all the stored messages and then returns (step 244) to the next step as indicated in FIG 3. (step 212). In the preferred embodiment, the prestored telephone number and user password are stored in non-volatile EPROM such that the telephone number and user password can be modified, if, for example, the user should change telephone numbers due to a move or the like.

FIG. 5 shows a situation where the user places a call, alterating a busy signal on the telephone line 15. During this time the remote telephone voice messaging system 14 may take a message from an incoming call. Referring to FIG. 5, the initial state of each component is as follows: the receiver 18 is on hook, the device 10 is on hook, the telephone voice messaging system 14 has not generated any special tone on the telephone line 15 and the external indicator 34 is off. The first time period 44 begins when the user picks up the receiver 18 to make an outgoing telephone call so the receiver is off hook, the device 10 remains on hook, the telephone voice messaging system 14 generates a dial tone until dialing begins. The time period 44 ends when the user hangs up the receiver 18 so the receiver is now on hook.

In this sequence, the first waiting period is initiated when the user hangs up the receiver 18 and is terminated when the device 10 goes off hook in order to test the dial tone for the special message waiting tone (time interval 46). The telephone voice messaging system 14 will send either a regular dial tone (indicating no message waiting) or will send the special message waiting tone (time interval 48). If the special message waiting tone is not received, the device 10 will test again later as shown in FIG. 3. Once the device 10 is on hook and has detected a message waiting tone, the device 10 turns the external indicator 34 on and the external indicator 34 remains on (time interval 50) until the receiver 18 is again off hook (time interval 52).

FIG. 6 shows a situation where the local telephone 12 rings and there is no answer. After a pre-set number of rings with no answer, the remote telephone voice messaging system 15 may take a message. Referring to FIG. 6, the initial state (time interval 54) of each component is as follows: the telephone line 15 is ringing, the receiver 18 is on the hook, the device 10 is on hook, the telephone voice messaging system 14 has not generated the message waiting tone and the external indicator 34 is off. After the telephone line 15 stops ringing, the device 10 waits, for example, for the first waiting period to allow the telephone voice messaging system 14 to take a message and set the message waiting tone (time interval 56). After the first waiting period, the device 10 is off hook while checking for the message waiting tone (time interval 58). If the special message waiting tone is not received, the device 10 will test again later as shown in FIG. 3. Once the device 10 is on hook after detecting the message waiting tone, the device 10 turns the external indicator 34 on and the external indicator 34 remains on (time interval 60) until the receiver 18 is again off hook (time interval 62).

FIG. 7 shows a situation where the local telephone 12 rings and the user answers, generating a busy signal on the telephone line 15 so the telephone voice messaging system 14 may take a message while the telephone line 15 is busy. Referring to FIG. 7, the initial state (time interval 64) of each component is as follows: the telephone line 15 is ringing, the receiver 18 has just gone from on hook to off hook, the device 10 is on hook, the telephone voice messaging system 14 has not generated the message waiting tone and the external indicator 34 is off. Time internal 66 indicates the time the user is using the local telephone set 12 after taking the call. Time internal 68 indicates the time the device 10 waits before testing the telephone line 15 for the special message waiting tone. If a message is stored by the telephone voice messaging system 14, the telephone voice messaging system 14 generates the message waiting tone (time interval 68).

Once the user hangs up the receiver 18 and the receiver 18 is on hook, the device 10 waits, for example, for the first waiting period to allow the telephone voice messaging system 14 to take a message and set the message waiting tone (time interval 68). After the first waiting period, the device 10 is off hook while checking for the message waiting tone (time interval 70). Once the device 10 is on hook after detecting the message waiting tone, the device 10 turns the external indicator 34 on and the external indicator 34 remains on (time interval 72) until the receiver 18 is again off hook (time interval 74).

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. A local telephone message announcing device for signaling a telephone user as to the presence of one of more recorded messages that are stored by a remote telephone voice messaging system for a telephone number associated with a telephone line to which said message announcing device is connected, said message announcing device comprising:

detecting means for identifying one or more predetermined signals on said telephone line, at least one of said predetermined telephone line signals generated by said remote telephone voice messaging system and indicating the presence of a recorded message stored by said remote telephone voice messaging system, said detecting means including hook means for indicating an off hook signal for said local telephone, tone means for indicating a message waiting signal from said remote telephone voice messaging system, and ring means for indicating a ring signal for said local telephone;

control means operably coupled to said detecting means and to said telephone line for automatically initiating the detection of said predetermined telephone line signals generated by said remote telephone voice messaging system in response to a first preselected time interval after said ring means has indicated a ring signal, and also initiates the detection of said predetermined signal after a second preselected time interval after said first preselected time interval; and notification means operably coupled to said control means for alerting said telephone user as to the presence of said recorded messages that are stored by said remote telephone voice messaging system in response to the identification of said predetermined telephone line signal.

2. The device of claim 1 wherein said control means further includes means for setting a continous monitor mode and automatically initiating the detection of said predetermined signal after a third preselected time interval if said continuous monitor mode is set.

3. The device of claim 1 wherein said control means initiates the detection of said predetermined telephone line signal by determining that there is no off hook signal, generating an off hook signal on said telephone line and monitoring said detecting means to determine the presence of said predetermined telephone line signal.

* * * * *